(12) United States Patent
Burrows et al.

(10) Patent No.: US 7,383,574 B2
(45) Date of Patent: Jun. 3, 2008

(54) METHOD AND SYSTEM FOR LIMITING THE IMPACT OF UNDESIRABLE BEHAVIOR OF COMPUTERS ON A SHARED DATA NETWORK

(75) Inventors: Michael Burrows, Palo Alto, CA (US); Raymond P. Stata, Palo Alto, CA (US); Jeffrey Clifford Mogul, Menlo Park, CA (US)

(73) Assignee: Hewlett Packard Development Company L.P., Houston, TX (US)

( * ) Notice: Subject to any disclaimer, the term of this patent is extended or adjusted under 35 U.S.C. 154(b) by 851 days.

(21) Appl. No.: 09/991,108
(22) Filed: Nov. 16, 200

(65) Prior Publication Data
US 2002/0073338 A1 Jun. 13, 2002

Related U.S. Application Data

(60) Provisional application No. 60/252,821, filed on Nov. 22, 2000.

(51) Int. Cl.
| G06F 9/00 | (2006.01) |
| G06F 15/16 | (2006.01) |
| G06F 17/00 | (2006.01) |
| G06F 11/00 | (2006.01) |
| G06F 12/14 | (2006.01) |
| H04L 9/00 | (2006.01) |
| H04K 1/00 | (2006.01) |

(52) U.S. Cl. .......................... 726/13; 726/11; 726/12; 726/14; 726/15; 726/22; 713/165; 713/166; 713/167; 713/187; 713/188; 713/189; 709/224

(58) Field of Classification Search ........ 713/200–202, 713/165–167, 187–189; 370/229; 709/226, 709/207, 238–254; 714/4, 47; 379/111–113; 726/13, 23–26
See application file for complete search history.

(56) References Cited

U.S. PATENT DOCUMENTS

| 5,260,945 A | * | 11/1993 | Rodeheffer | 714/4 |
| 5,640,504 A | * | 6/1997 | Johnson, Jr. | 714/4 |
| 6,185,185 B1 | * | 2/2001 | Bass et al. | 370/230 |
| 6,285,748 B1 | * | 9/2001 | Lewis | 379/112.01 |
| 6,389,532 B1 | * | 5/2002 | Gupta et al. | 713/163 |
| 6,393,465 B2 | * | 5/2002 | Leeds | 709/207 |
| 6,453,430 B1 | * | 9/2002 | Singh et al. | 714/47 |
| 6,556,541 B1 | * | 4/2003 | Bare | 370/235 |
| 6,578,086 B1 | * | 6/2003 | Regan et al. | 709/242 |
| 6,591,306 B1 | * | 7/2003 | Redlich | 709/245 |
| 6,826,611 B1 | * | 11/2004 | Arndt | 709/226 |

* cited by examiner

*Primary Examiner*—Ayaz Sheikh
*Assistant Examiner*—Longbit Chai (57) ABSTRACT

Undesirable behavior patterns of computers on a network impact network performance. A system and method are provided for limiting the impact of undesirable behavior of computers on the network. The network, through which packets of data are interchanged between the computers, includes one or more forwarding devices that are controlled or instructed by one or more packet traffic monitors. Each of the packet traffic monitors is configured for monitoring the packets; for determining if the information about the pattern of behavior from any of the computers is trustworthy; for determining, upon discovering that one or more of the patterns of behavior is undesirable, a type of the undesirable pattern behavior; and for determining a proper action for mitigating that type of undesirable behavior. The proper action is performed by mitigation means controlling the one or more forwarding devices.

32 Claims, 4 Drawing Sheets

METHOD AND SYSTEM FOR LIMITING THE IMPACT OF UNDESIRABLE BEHAVIOR OF COMPUTERS ON A SHARED DATA NETWORK

REFERENCE TO PRIOR APPLICATION

A claim is hereby made for the benefit under 35 U.S.C. 119(e) of U.S. Provisional Application Serial No. 60/252,821, filed Nov. 22, 2000, titled "Method and System for Limiting the Impact of Undesirable Behavior of Computers on a Shared Data Network," which is incorporated herein by reference.

FIELD OF THE INVENTION

The present invention is generally related to computer networks and, specifically, to switch, router or bridge-based networks.

BACKGROUND OF THE INVENTION

Computer networks connect and provide a data communications service between addressable devices (or nodes), including computers, servers, printers and the like. Computer networks are generally classified according to their geographical extent as local area networks (LANs), metropolitan area networks (MANs) and wide area networks (WANs). The present invention is related to and can be implemented in any of these network classes.

Ethernet is one technology of choice upon which data networks are built. Ethernet is typically characterized as a multi-access packet-switched communications network for carrying data among locally distributed computers. The shared-communications channel in Ethernet is a passive broadcast medium with no packet address recognition or central control. The passive broadcast medium forms a backbone of the Ethernet network and a transmission medium that is shared between two or more addressable devices. A LAN in the Ethernet network is a network segment that covers a relatively small geographic area. Although LANs offer a high-speed communications and data sharing service, LANs have basic limitations such as the number of addressable devices, bandwidth and physical extent. By comparison, MANs and WANs offer a greater physical extent and larger number of addressable devices but slower communications speed.

To extend the benefits of a LAN beyond its basic limitations, forwarding devices (referred to also as stations) such as switching, routing or bridging devices are often used to form an extended network. Forwarding devices are multi-port addressable devices interposed between any number of LAN backbones or between LAN backbones and the long distance backbones of a MAN or WAN.

In making data traffic forwarding decisions, these devices use unique identifiers (UIDs) of the computers (also referred to as hosts or end stations). Specifically, computers communicate by sending and receiving packets or groups of packets that in addition to payload include MAC (media access control) addresses (or UID) of the source and destination computers (the MAC address is considered a low-level address as compared to an internet protocol, IP, address).

In forwarding data traffic, the forwarding devices distinguish packets by their destination address type. For example, a unicast packet is a packet with a particular host address as its destination. A packet that is sent to a group of hosts is a multicast packet. In this case, the packet includes a group address UID as its destination. A group address dedicated to the group of all hosts is a broadcast address and a multicast packet addressed to all hosts is a broadcast packet. One type of broadcast packet, known as an ARP (address resolution protocol) request, is sent for requesting the Ethernet address (UID or MAC address) of a host in the network. The ARP request contains the IP address of the host to be queried and that host, upon recognizing the IP address as it own returns a MAC address answer. ARP is the protocol used to map IP addresses to MAC (Ethernet) addresses for transport of data traffic from the Internet to hosts via the local network (Ethernet segment).

In providing the foregoing data communications service, networks can be distinguished based on the type of forwarding device(s) they include. Forwarding devices commonly used in networks include hubs, repeaters, switches, bridges and routers. A repeater is physical layer (layer 1) device used to interconnect the conductor segments of an extended network and enables them to be treated as a single conductor. The repeater amplifies and restores the timing margins of packet bit streams, but it does not use addressing for packets forwarding. A hub is a physical layer device that connects multiple hosts via dedicated conductor, and in some respects it functions as a multi-port repeater. The hub receives a packet in one port and re-transmits it to all of its other ports. However, in a shared media comprising a hub-connected Ethernet segment all hosts are competing for a limited amount of bandwidth.

A switch is also a physical layer device although more intelligent than the hub. A switch is a multi-port device designed with logic for knowing to which port of the switch each device (e.g., host or another switch) is connected. The switch isolates each port and makes it appear that the network attachment to that port is the only one. Any data received at one of the ports is then switched, using the logic in the switch, to a specific destination port. The switch will flood packets to every port if it is not sure where the destination of such packets is or if the destination address in the packets is a broadcast address. Since the switch operates at the physical layer it switches in hardware. Thus, in extended networks, this faster throughput and higher port density make switching technology a more dominant complement to routing than bridging.

A bridge is a data layer (layer 2) device that switches in software, and it is concerned with addresses of network devices and not the actual paths between them. The bridge enables devices on different LAN segments to communicate with each other as if they were on the same switch or hub, and it interconnects LANs of unlike bandwidth. The Bridge can filter packets based on data-layer information contained within the MAC address, protocol, etc. Moreover, the bridge will flood packets to every host in the topology network if it is not sure where the destination of such packets is or if the destination address in the packets is a broadcast address. Thus, bridges propagate ARP request broadcasts like any other Ethernet broadcast and transparently bridge (forward) the ARP answers. Bridges respond to ARP requests for hosts known to them or, alternatively, they send their own ARP requests on the network. Notably ARP requests are transparent to bridging but not to routers. In a bridge-based network, when the one or more bridges forward packets by flooding or forward broadcast traffic (including ARP requests), the bandwidth of the network is limited to the bandwidth of a single LAN. This limitation is present even with richly connected network segments, especially since redundant connections are inactive standby connections.

Figure 1:
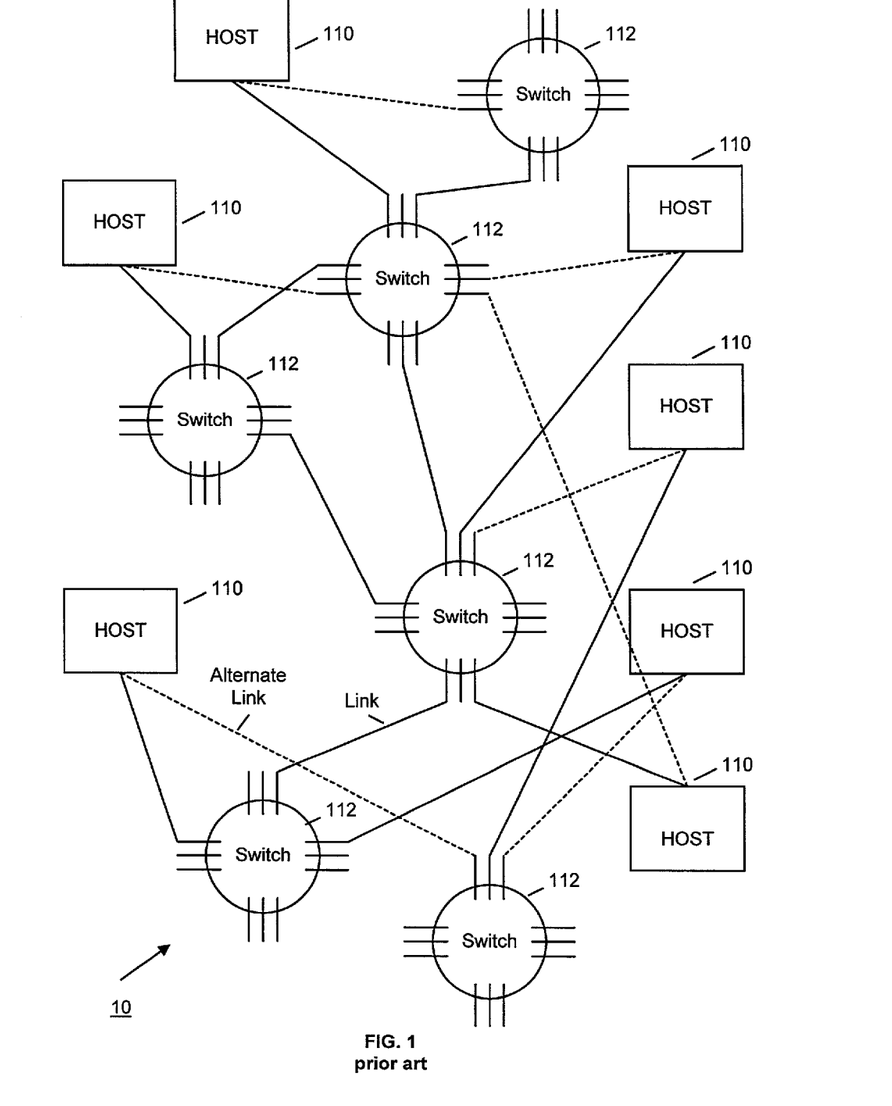
FIG. 1 illustrates a switch-based network.

By comparison, in a switch-based network switches are faster but switches do little to restrict passage of broadcast traffic in the network. Broadcast traffic is not restricted in a switch based network since switches will flood packets to every port if they are not sure where the destination of such packets is or if the destination address in the packets is a broadcast address. Generally, a switch-based network as shown in FIG. 1 is characterized in that it does not discard any packets except during reconfiguration of the network. FIG. 1 illustrates a switch-based network 10 where the forwarding devices (switches) 112 are interconnected in an arbitrary topology. Their larger scale makes switch-based networks particularly vulnerable to common network pathologies including broadcast storms, ARP fights, stolen MAC addresses or any other undesirable behavior. Such pathologies exist in traditional, shared broadcast media, but are more relevant in switch-based networks because of their large scale and modem pressure for Internet addresses. And, they may happen either by accident or through malice by rogue computers.

ARP fights occur when two hosts with different MAC (layer 2 hardware) addresses conflict for the same IP address. ARP fights occur for example as a result of misconfiguration or buggy implementations of DHCP (dynamic host configuration protocol) which is a protocol for dynamically allocating IP addresses to computers on a LAN.

A stolen Ethernet (MAC) address situation occurs when two IP addresses map to the same MAC address. ARP is not suited for resolving conflicting responses, and it could be used by an unruly host in a man-in-the-middle attack. Such attack is characterized in that the unruly host illegally intercepts the ARP request communications and adopts other hosts' MAC addresses.

Broadcast storms occur when a buggy or malevolent host emits a continuous stream of broadcast packets. With the emission of a broadcast storm, even a single host can impose a limit on the practical size of a network through consumption of too many network resources. For example, a single host can execute a denial-of-service attack on all other hosts on the same subnet. In larger networks, disruptive behavior, including behavior akin to broadcast storms, can be frequently exhibited simply because there are numerous hosts.

In order to isolate broadcast storms, a switch-based network (or bridge-based network) can be broken into discrete broadcast domains, referred to a virtual LANs (VLANs), which are connected through routers. A router is a network layer (layer 3) device that uses network addressing and a routing protocol in forwarding packets. Unlike a bridge, the router is concerned with the paths between devices. The router analyzes the addresses of all packet traffic coming in through its ports and if the traffic is not local, the router sends the traffic out through one of its other ports. Thus, when a host sends a packet to a router it sends that packet addressed to the router's physical layer (MAC) address with the network layer (protocol) address of the destination host. As it examines the destination hosts protocol address the router determines that it either knows or doesn't know how to forward the packet to the next hop (router). If the router knows the next hop, it changes the MAC address to that of the next hop and forwards the packet to that hop; and, alternatively, if it knows the destination address the router forwards the packet to the destination host. As mentioned before, ARP requests are transparent to bridging but not to routers. Routers do not propagate the ARP request broadcasts because routers are network level (3) devices, and Ethernet, Token-Ring, FDDI (fiber distributed data interface) and ATM (asynchronous transfer mode) are data-link protocols (data layer (2) protocols). For propagating a packet, the host must first use its routing protocols to select the proper router (i.e., the proper IP address of the proper router) that can be reached via Ethernet ARPs. The proper router responds to an ARP request containing its IP address with its MAC (Ethernet) address. Then, the packet is transmitted to the MAC address of the router through which it is re-transmitted toward its actual destination.

To improve throughput performance, many scaled networks utilize Ethernet switches (e.g., Gigabyte Ethernet switches) between routers in a routed backbone. Switch-based Ethernet networks that are scaled through routers isolate the broadcast domains and are able, in turn, to isolate traffic between different pairs of hosts for performance and security. Moreover, their aggregate bandwidth allows switched networks to scale larger than broadcast networks using hubs. However, routers are inherently slower because of the added processing they do in packet analysis. Namely, routers introduce bottlenecks in data traffic. And routers do not solve others of the above described network pathologies.

Accordingly, there remains a need to address network communications problems. To that end, the present invention provides solutions that address the above-mentioned pathologies.

SUMMARY OF THE INVENTION

The solution proposed by the present invention can be implemented as a method, system, device, computer product or computer program module. Preferably, the present invention contemplates a solution that includes using a packet traffic monitor that can observe packets in one or more places on the network. The packet traffic monitor may be built into network components such as switches or hosts, or it may be built as a separate device. When the packet traffic monitor is attached to a forwarding component (e.g., switch), and not to the hosts it monitors, it cannot simply shutdown those hosts. Hence the packet traffic monitor relies on interrogating and influencing packet forwarding decisions of the switches (or other forwarding devices). The packet traffic monitor is configured, or programmed, to recognize undesirable packet traffic patterns and to instruct appropriate switches to discard packets or isolate offending hosts when an undesirable pattern is detected.

Although the invention contemplates using the packet traffic monitor to detect any types of behavior and undesirable patterns of packet traffic, the packet traffic monitor is preferably expected to detect at least pathologies that are listed below. The pathologies (or network faults) of greater interest include: (1) broadcast storms—overuse, or inappropriate use of the broadcast address or multicast addresses; (2) stolen IP address—use of an IP address by two machines simultaneously. The monitor is expected to detect this situation, and from previous observation of the network to guess which host normally uses the address; (3) stolen MAC address—use of a MAC address by two machines simultaneously; and (4) malformed packets. It is noted that the packet traffic monitor can be configured to look for a wide-range of behaviors that an administrator might consider undesirable although not necessarily network "faults."

Which patterns can be observed will depend on where in the network the packet traffic monitor is placed. To detect a broadcast storm, the monitor could be placed anywhere in the network (except perhaps at a low-bandwidth links). To detect other packet traffic patterns the monitor might have to be placed in strategically located points. For example, to detect overuse or abuse of a given server, the monitor would have to be able to see packets arriving at that server.

The invention causes the undesirable packets in the network not to be forwarded through the network. For example, in the case of broadcast storms, the broadcast packets would not be forwarded for exponentially longer periods of time as the offending host continues to try to send them. Although the host may still flood its local segment it cannot flood the rest of the network.

With the use of the packet traffic monitor, the invention can advantageously limit the damage caused by overuse of broadcast packets without needing to use routers for this purpose, and without preventing acceptable broadcast packet traffic. The invention can limit the harm done by a host to the network segment containing the host, rather than to the (possibly much larger) subnet.

In accordance with the purpose of the present invention as embodied and broadly described herein, each of the packet traffic monitors can be configured for monitoring the network for patterns of packet traffic behavior and for determining if the information about a particular pattern of behavior from any of the computers is trustworthy. It is further configured for determining, upon discovering that one or more of the patterns of behavior is undesirable, the type of the undesirable pattern behavior; and determining a proper action for mitigating that type of undesirable behavior. The proper action is performed by mitigation means that can control the forwarding devices.

Advantages of the present invention will be set forth, in part, in the description herein and, in part, will be understood by those skilled in the art from the description herein. The advantages of the invention can be realized and attained by means of the elements and combinations particularly pointed out in the appended claims and equivalents.

BRIEF DESCRIPTION OF DRAWINGS

The accompanying drawings, which are incorporated in and constitute a part of this specification, illustrate several embodiments of the invention, and, together with the description, serve to explain the principles of the invention. Wherever convenient, the same reference numbers will be used to refer to the same or like elements throughout the drawings, in which.

DETAILED DESCRIPTION OF THE INVENTION

The present invention provides a solution intended for limiting the impact of detrimental behavior of computers interconnected via a shared data network. The solution may be implemented in a method, system, device, computer program product or computer program module. The invention introduces to the network one or more packet traffic monitors configured to detect undesirable behavior and to mitigate its effects. A packet traffic monitor in accordance with the present invention would detect this behavior automatically To enable one of ordinary skill in the art to make and use the invention, the description of the invention is presented herein in the context of a patent application and its requirements. Although the invention will be described in accordance with the shown embodiments, one of ordinary skill in the art will readily recognize that there could be variations to the embodiments and those variations would be within the scope and spirit of the invention.

A primary goal of the invention is to limit the impact of undesirable behavior of computers on a shared data network through which packets of data are passing to all its computers. To that end the invention contemplates monitoring the network for any pattern of packet traffic behavior that can be considered undesirable. A pattern of behavior can be identified as a sample or something which is used as an example of behavior, a recognizable way in which something is done, organized or happens, or any regularly repeated arrangement of data, signals etc. Moreover, a pattern of behavior can include a single packet of data or any other number of packets or groups of packets. Undesirable or offending behavior can include any behavior that is designated by a network administrator as notable or, more specifically, unwanted, detrimental or unwelcome. Furthermore, even if not specifically designated by a network administrator as notable or undesirable, a pattern of behavior can be considered undesirable any time it is unwanted, detrimental or unwelcome. Examples of such undesirable behavior are the common network pathologies (or LAN pathologies) as outlined above and as will be further mentioned below.

In dealing with recognition of undesirable behavior, the invention is designed to rely on an understanding of the network topology (be it switched Ethernet network, bridged Ethernet network, scaled switch-based network or the like). This understanding is gained through a discovery of the network topology.

Topology Discovery

Understanding the network topology is important for a number of reasons. One reason for understanding network topology is that it helps in deciding which port (or communication channel) should be disabled when undesirable packet traffic is detected. Another reason is that it facilitates identification of offending computers' locations ('bad' hosts locations). To that end, the packet traffic monitor discovers the topology of the network, and this discovery is dependent in part on the type of network (i.e., the type of forwarding devices the network includes). Network topology, defines the manner in which network devices are organized, although network topology defines a logical architecture as compared to the actual physical architecture of the network. To better understand the discovery aspect, it is worth describing in the first place how the network topology is obtained in various types of networks, i.e., router-based, bridge-based and switch-based networks.

In router-based networks, routing involves two basic activities: determining optimal routing paths and switching. To aid the process of optimal paths-determination, specific routing algorithms initialize and maintain routing tables that based on the network topology contain the shortest paths to reachable networks. These tables contain an entry for each network that can be reached from the router and they provide the basis for routing decisions. Routers exchange routing information periodically to keep their routing tables current so that at any point in time any router knows about any other router in the network topology. The tables contain for example all destinations advertised by neighboring routers where each entry includes the destination address and a list of neighbors that advertised that destination address. For each neighbor, the entry records the advertised metric (e.g., path length) which the neighbor stores in its routing table. Thus, a router-based network adapts to topology changes, and having recorded the current network topology information, each router can have all the information it needs to make the routing decisions. Then, a packet traffic monitor can poll or interrogate that information in gaining its understanding of the network topology.

A bridged Ethernet network is another network that adapts to network topology changes in that it provides for configuration and re-configuration of forwarding tables. Bridges learn the network topology based on the source MAC address and forward packets based on the destination MAC address. The bridged Ethernet network maintains a loop-free forwarding tree (spanning tree), although as compared to the switched Ethernet network, a bridged Ethernet network supports multiple-access links and it reconfigures slower. Learning, forwarding and filtering, refined by a spanning tree algorithm, comprise the basic functionality of a bridge. Learning, filtering and forwarding, rely on the existence of a single path between any two devices on the network. The spanning tree algorithm is the means by which bridges can eliminate loops in the network topology. To ensure a single path between any two devices, the spanning tree algorithm constructs the spanning tree by a series of bridge-to-bridge negotiations, where the spanning tree represents any unique device-to-device path in the network. The spanning tree is then used in forwarding packets. For example, upon receipt of a broadcast packet, bridges forward the packet up the spanning tree to the root-bridge and then flood the packet down the spanning tree to all the hosts (destinations). Bridges propagate ARP request broadcasts like any other Ethernet broadcast and transparently bridge (forward) the answers. Once the spanning tree is constructed based on the current topology of the network the packet traffic monitor can poll or interrogate the bridges in order to gain an understanding of the network topology.

It is noted that although the present invention can be implemented in the foregoing types of networks it is preferably implemented in a switch-based network. A scaled LAN composed of crossbar switches interconnected by full-duplex links is an example of a switch-based network in which ports of switches can be directly connected to one another and to hosts in an arbitrary topology. The switched Ethernet network has an implicit addressing structure induced by the point-to-point links, where the next hop of a packet is known. Software in the crossbar switches, builds packet forwarding (routing) tables and rebuilds them whenever switches or links fail or recover or as switches and links are added or removed. Whenever the topology changes, the switches determine the new topology and update the forwarding tables. The forwarding tables map each MAC address to an output port of the switch. Since the switched Ethernet network has an arbitrary topology, in order to avoid possible deadlocks in routing packets through arbitrary paths, the routing algorithms can restrict the paths to a set of deadlock-free paths based on a loop-free assignment of direction to operational links. In a graph representation of the switched Ethernet network topology, the hosts and switches are vertices and links between them are edges. The graph is formed as a spanning tree constructed from a specific root where each link is assigned a direction such that the directed links do not form loops. Routing paths are determined dynamically by the switches as packets pass from switch to switch (i.e. from point to point). In this example, the forwarding tables are built dynamically in process that involves monitoring, topology acquisition, and routing. Monitoring determines which links are useful for carrying packets from one switch to anther. Topology acquisition discovers the network topology and delivers that description of it to every switch. Routing uses the topology description to compute the forwarding tables for each switch.

Since the switched network topology takes the form of a tree, either by physical connection or by use of the spanning tree protocol, topology discovery is the process of recovering that tree from the switches. (By analogy, in a router-based scaled, switched Ethernet network the forwarding tables with next hop IP addresses would be obtained from the respective routers.) To that end, the packet traffic monitor's uses a network management protocol interface. As an example, understanding of network topology can be gained by utilizing standard SNMP (simple network management protocol) interface for network hardware (components) management. It is noted that SNMP is a widely used network management protocol, although other standard or proprietary network management protocols can be suitably used for this purpose. Additional information can be used, including, optionally, from a remote network monitor that accumulates historical data traffic statistics for a network segment.

Detecting and Mitigating Undesirable Behavior

Upon discovering the topology of the network (be it switched Ethernet network or, by analogy, the topology of the bridged Ethernet network, router-based scaled, switched Ethernet network or the like) and upon learning about the capacity of the network components the packet monitor can observe the network. For example, in a switched Ethernet network, the packet traffic monitor learns about the per-port ingress packet counters in the switches and it can poll such counters to observe the number of broadcast packets.

In accordance with its intended purpose, the invention envisions using the packet traffic monitor to determine the existence and source of any pattern of undesirable behavior, including network pathologies such as broadcast storms or ARP fights, and to limit the effects of such behavior. When the packet traffic monitor detects undesirable behavior, including overuse or misuse of the network, as one measure, the monitor takes steps to mitigate this behavior. For example, the packet traffic monitor disables the offending network segment to isolate the offending hosts from the rest of the hosts in the network, or at least from the hosts they are disrupting. Preferably, the invention uses the packet traffic monitor to direct one or more switches (or other forwarding devices such as bridges or smart bridges) to cease forwarding undesirable data traffic.

Thus, upon detecting for example a broadcast storm, the packet traffic monitor mitigates such undesirable behavior pattern by instructing as many switches in the network as possible to stop forwarding those broadcast packets, or perhaps any packets from the offending host. This would allow construction of a large network that would normally allow broadcasts to propagate over the entire network, but which would recover from hosts sending too many broadcast packets. This helps solve a serious problem in conventional networks—especially extended LANs constructed from many Ethernet segments and bridges.

As mentioned above, scaled networks can be constructed using routers to connect the VLANs or "subnets." As further mentioned, each subnet in the router-based scaled networks can be an isolated domain for packet propagation, where broadcast packets are directed by switches only to the hosts within the same subnet. This limits the damage that can be done by a host that sends too many broadcast packets. This property of routers is often quoted as a reason for using routers instead of constructing a large subnet using only switches or bridges. However, it is not desirable to use routers in this way. One reason is that setting up router parameters and tables can be significantly burdensome to an administrator. And since a router needs to allow (or prevent) broadcast packets to reach all the hosts, it is likewise burdensome to have to worry about which subnet a given host is in. Accordingly, although the present invention can be implemented in a router-based network the present invention contemplates preferred solutions at the switch level (in shared data networks).

In a switched Ethernet network, performance anomalies as outlined above can be addressed by influencing the forwarding scheme in the switches. (By analogy, anomalies in other types of networks, e.g., bridged networked, are addressed by influencing the forwarding schemes of their respective forwarding devices). One way of influencing the forwarding scheme is discarding offending packets. Another way is to reconfigure the forwarding table or to adjust the routing table in order to stop 'bad' packets. Another way of influencing the forwarding scheme is turning off ports, which will isolate all hosts in the network segment, including non-offending hosts. Yet another way of influencing the forwarding scheme is filtering source and destination IP addresses. However, the preferred way of influencing the forwarding scheme is filtering source MAC addresses. As a result, a particular offending host or segment can be selectively isolated for certain time periods.

Once forwarding is disabled, the disablement and recovery time interval can be controlled. This measure is in many ways similar in character to the skepticism level and recovery time combination as described in U.S. Pat. No. 5,260,945, issued Nov. 9, 1993, by Thomas Lee Rodeheffer, titled "Intermittent Component Failure Manager and Method for Minimizing Disruption of Distributed Computer System," which is incorporated herein by reference (hereafter "Rodeheffer"). Although, unlike the present invention, Rodeheffer's approach is directed to failure management that responds to component or link failures or intermittent failures, the basic idea of skepticism and recovery time control (as will be later described) is adopted by the present invention. Other measures are not precluded although this approach has been shown to produce good results.

In general, a skeptic is used when a fault monitor, separate or integral to the skeptic, recognizes a "broken" component or connectivity (or link). Upon receiving a fault indication, the skeptic enters a wait state before it lets such component or connectivity to recover, i.e., rejoin the network and prompt reconfiguration of the network topology graph, after it starts working again. When a broken component (e.g., host) is detected, that component is taken out of operation for successively longer periods in a random exponential backoff before an attempt is made to use it once more. The monitor reduces the backoff exponent by one (or other value) if the component is put into service and does not fail again for the current backoff time. Conversely, the backoff time is increased if the component breaks again. Thus, often or intermittently broken components are "removed" from the network for progressively longer periods of time, and "repaired" components eventually "forget" their failed history. Namely, a broken component with a long history of failure will be allowed to recover after a progressively longer wait period and more severe penalty, as compared with the progressively decreasing wait period and penalty imposed on a broken component with a 'good' history. In one embodiment, the good history can be classified as skepticism level zero (0). Failure cycles in greater numbers increase the skepticism level accordingly. In other words, the skepticism level determines the recovery wait period.

By contrast to Rodeheffer's scheme of link and component failure management as described above, the present invention uses the packet traffic monitor to manage network pathologies. In the most general case, the invention is configured to monitor any undesirable behavior patterns including broadcast storms and ARP fights, stolen MAC addresses, malformed packets, etc. Through heuristics, the packet traffic monitor can detect behavior patterns of any kind; and this detection is automatic. For example, the monitor can detect too many packets destined to an overloaded server, too many probe packets directed to a firewall or too many ARP request packets. As a further example, the packet traffic monitor can detect packets arriving in response to ARP requests with more than one packet having a similar MAC addresses, or packets arriving from hosts that use a similar IP address. Upon detecting such behavior the packet traffic monitor can cause an offending host to be isolated from the network either directly or indirectly, as will be later explained.

Indeed, on detecting an offending packet or an undesirable pattern of packets, the packet traffic monitor may react in the same manner as the aforementioned skeptic in Rodeheffer's fault monitor. Namely, the packet traffic monitor could treat the undesirable packet traffic pattern or behavior as a "fault", and the originating host of the packets as a "faulty component". Then, as explained above, the packet traffic monitor will isolate the faulty host (or stop forwarding its packets) for exponentially increasing time periods while the undesirable behavior continues or repeats. It is noted that the packet traffic monitor can be configured to look for a wide-range of behaviors that an administrator might consider undesirable although such behaviors are not necessarily considered network "faults." These aspects of the invention are designed to alert the system administrator, preferably via electronic mail, and to take action in the case of broadcast storms.

Broadcast Storms

To recap, broadcast storms occur when a buggy or malevolent host emits a continuous stream of broadcast packets. Repeated broadcast packets are considered broadcast storms when certain network-administration-policy-dependent conditions apply. For example, a network administration policy may set forth that 10% of the network bandwidth can be consumed by broadcast packets. The bandwidth is that of the network's lowest-speed link (or segment). The packet traffic monitor can thus determine that any use beyond this limit is a broadcast storm.

In one embodiment, the packet traffic monitor observes the network and thereby detects and localizes all broadcast packets traffic. Observing more than a predetermined number of broadcast packets within a predetermined time period implies that a broadcast storm is underway. It is likely that the packet is correctly addressed, and that knowing the source MAC address and the network topology will point to a particular port of a forwarding device, e.g., switch port, to be disabled. In another embodiment, the per-port broadcast ingress packet counters can be used to trace broadcast packets to their source. This approach is used if the packet traffic monitor fails at determining the source, possibly because of incorrectly formatted packets or because the misbehaving host has not been seen on the network before (unknown MAC address). This detection approach is less timely than the prior approach since the process of retrieving these counters from the switch is extensive and it cannot be executed often.

Once existence of a broadcast storm is detected, warranting action, the port associated with the offending host is disabled. The port will be re-enabled after the passage of an interval, which doubles each time the source port is disabled (i.e., exponentially increasing time period).

Stolen MAC Address

A stolen MAC address situation results from the use of the same MAC address by two hosts with different IP addresses. When the simultaneous use of a MAC address is observed, having gained an understanding of the network topology, the packet traffic monitor can choose one of the conflicting hosts to stay in the network and disable others.

ARP Fights

The packet traffic monitor watches for ARP requests, which are, by nature, broadcast to all hosts. The packet traffic monitor can detect excess ARP requests by finding more that a preset number of ARP requests during a predetermined period of time interval, say 5 minutes. In dealing with ARP fights, the invention monitors the broadcast traffic associated with ARP requests, and verifies the stability and lack of conflict in the IP to MAC address mapping. The packet traffic monitor queues both the source and destination IP addresses from the ARP request for verification. This queue is used to reduce the overall traffic load imposed on the network by the packet traffic monitor. Every second (or other suitable time period), the packet traffic monitor chooses the next IP, and sends an ARP request. If two conflicting responses are received, then two machines have decided to use the same IP address. Then the packet traffic monitor can notify the network administrator by electronic mail.

A packet traffic monitor recognizing an ARP fight is required to determine which IP address is the one correctly associated with that MAC address. A host presently connected in the network (and presumably included in its topology graph) has a known MAC address and a known corresponding IP address. Therefore, it would seem that the received MAC address belongs to the host more likely associated with the correct IP if the host is already present in the network. Based on that, the packet traffic monitor preferably compares the received MAC against all known MAC address in order to find a match and correspondingly to find the correct IP address of the appropriate host. Alternatively, the packet traffic monitor assumes that a host that initiated an ARP request was originally on the network and its corresponding IP address is the correct one to use.

Notably, the preferred scheme involves detecting undesirable packets because, short of self-policing hosts, this detection is what instructs forwarding devices such as switches in making their forwarding decisions. Detecting undesirable packets enables the packet traffic monitor to instruct switches to cease forwarding the undesirable packets from offending hosts thereby, indirectly, isolating these hosts from the network.

A policy question is whether the host having the IP address for the longest time should be entitled to continue using it. On the other hand, this IP address might be an address previously allocated by DHCP (dynamic host configuration protocol), for which the host (for any number of reasons) has not properly renewed the lease. Because of this predicament the solution may be limited to notifying the administrator. However, there are some interesting possibilities to be considered.

One possibility arises from the fact that an Internet Software Consortium (ISC) DHCP server includes a flat text file containing its IP to MAC address mappings. Any MAC address that contradicts this list would be disabled. Ideally, the DHCP protocol would include a provision for such verification. Another possibility arises from the fact that some institutions keep a list of MAC addresses that are allowed to obtain an IP address via DHCP. This list includes the user who owns the machine, which would make it particularly easy to notify the parties involved.

Placement of the Packet Traffic Monitor

The effectiveness level of the foregoing approaches depends on the placement of the packet traffic monitor. Likewise, placement of the packet traffic monitor determines the type of network pathology it can better address. The more strategic the location the better the result.

In the case of overuse or abuse of a given server, the monitor would have to be placed such that it is able to monitor packets arriving at that server. If a packet traffic monitor were able to shut off or filter the stream of all packets sufficiently early it would be useful in counteracting attacks such as distributed denial-of-service attacks. Distributed denial-of-service attacks occur where one or a group of malicious hosts send packets in such large numbers that they impose a significant load on their target and prevent other hosts from reaching that target. Ideally, for such attacks each host should have a dedicated packet traffic monitor.

If the network is a mixture of high-speed and low-speed segments, the monitor should be placed in the high-speed link to detect broadcast storms more reliably. If, instead, the packet traffic monitor were to be placed in a low-speed link, a broadcast storm would flood that link before that monitor would have a chance to send its packet to control (or instruct) the switch. In any case, packet traffic monitor packets will preferably have a higher priority over regular packets.

Figure 2:
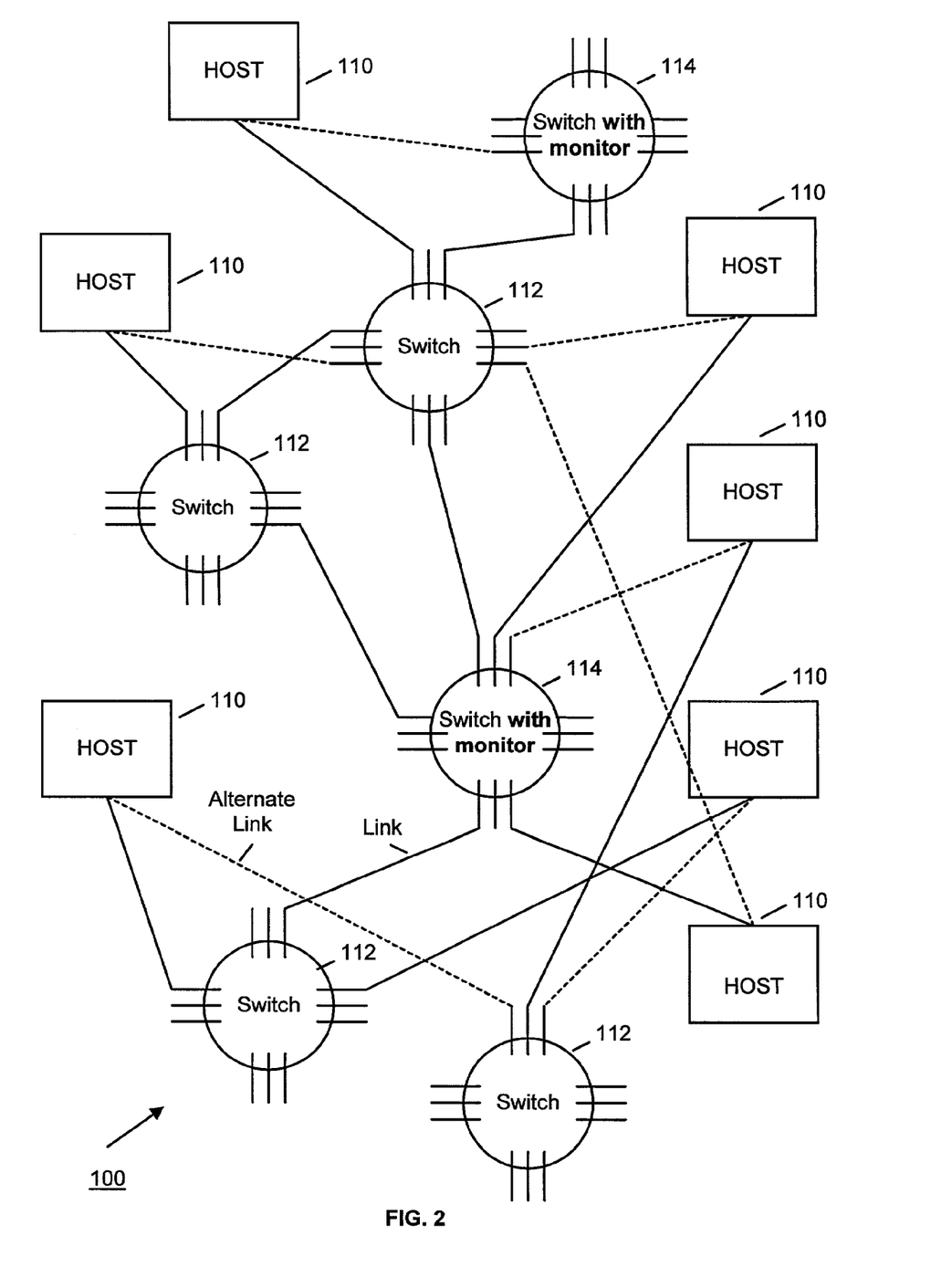
FIG. 2-4 illustrates a switch-based network with one or more than one packet traffic monitor.
Figure 3:
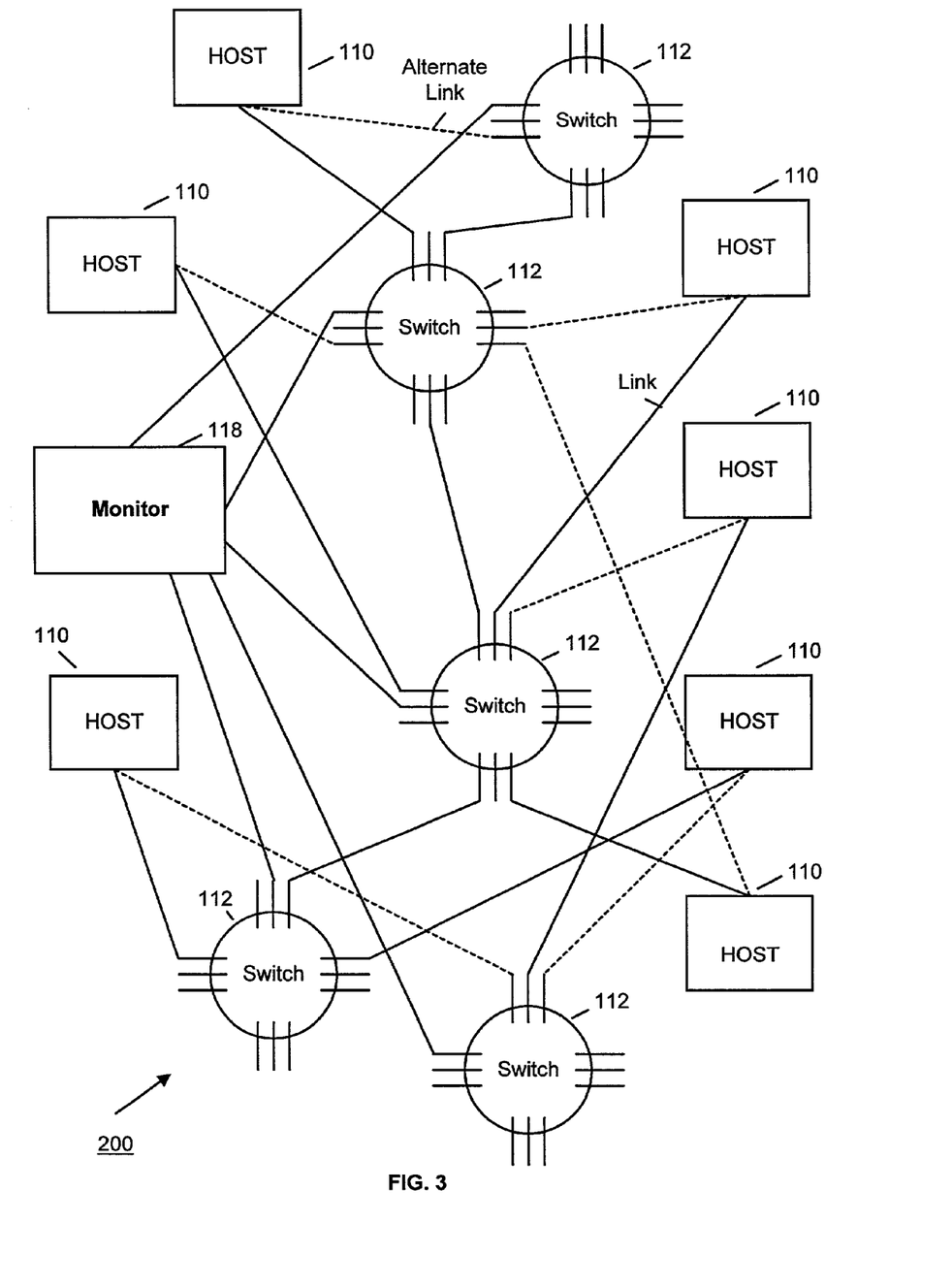
Figure 4:
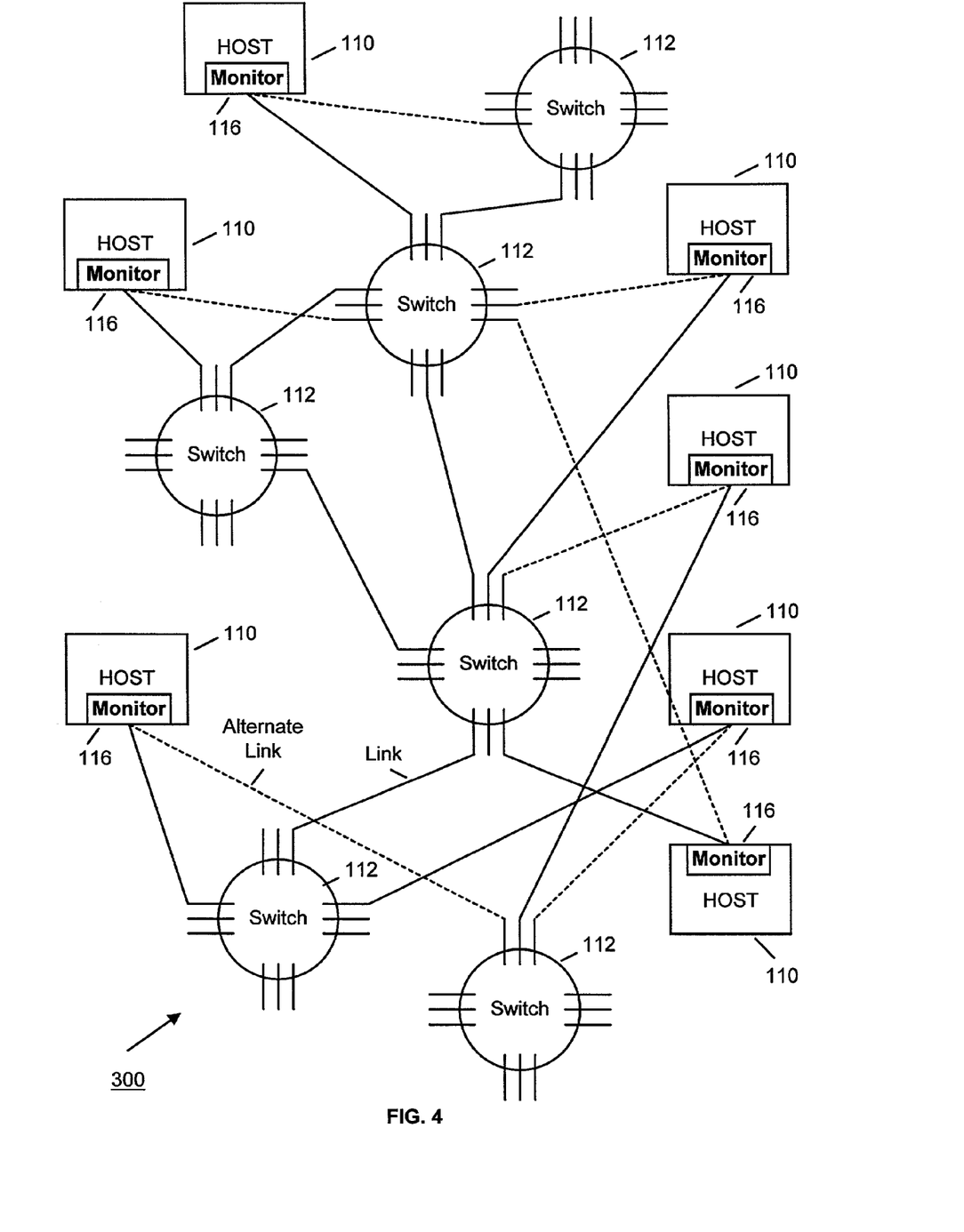

Accordingly various placement schemes are possible in which one or more packet traffic monitors can be strategically placed in the network. Moreover, it is possible that, at any given time, several packet traffic monitors are simultaneously in use on a single network. FIGS. 2-4 provide examples of packet traffic monitor placement in a switch-based shared data network.

In the network 100 of FIG. 2, the packet traffic monitor is an integral part of one or more of the switches 114. In the network 200 of FIG. 3, the packet traffic monitor 118 is a device distinct from but connected to one or more of the switches 112. The effectiveness of the packet traffic monitor in isolating offending hosts increases with its ability to monitor greater number of communication paths and with its ability to instruct (or control) a greater number of switches. Internally, this may necessitate means for monitoring a plurality of paths or, instead, a plurality of devices each for monitoring a path. Alternatively, a packet traffic monitor is more effective if it can control the majority (or a larger number) of the switches. Typically, networks are configured with one type of switches, and this uniformity makes the packet traffic monitor easier to configure for communication with the switches.

FIG. 4 illustrates a network 300 in which each host 110 is self-policing with its dedicated packet traffic monitor 116 (internal or external to the host). Alternatively (not shown), there could be a device (or software module) in each host that is operatively cooperative with an external packet traffic monitor in that such device gathers information about and allows the monitor to control the host.

Thus, there is a continuum extending between two extremes. At one extreme, the packet traffic monitor is present in or associated with each of the hosts that, in addition, are cooperative with it. At the other, less desirable extreme, there is a single packet traffic monitor in the network and no cooperation from any of the hosts. Even with a condition similar to the less desirable extreme condition, in a hypothetical Ethernet segment with one switch and one host (or one switch per host), broadcast storms from/to the host can be readily stopped. By comparison, if multiple hosts are connected to one switch on the Ethernet segment, the switch may isolate the segment from other segments but it will not be able to isolate hosts within that segment from broadcast storms.

FIGS. 2-4 show the packet traffic monitors as a device or a sub-component of other devices. Indeed, the packet traffic monitor could be implemented as a hardware module built into network components such as switches or hosts, or it may be built as a separate device. It is noted however, that the preferred implementation of the packet traffic monitor is a computer program (or software) module. And this software module can be configured into the system software of a separate device, a switch, a host, etc. The packet traffic monitor software module can be added to the existing system software and is likely to be a privileged application. Moreover, this software module can be, but it is not required to be, a part of the operating system.

In one embodiment the present invention envisions a monitor that observes packets traffic at various points on the network by prompting the switches or hosts to forward packets to the monitor. Alternatively, various points on the networks can be randomly or selectively "sampled" rather than being exhaustively monitored, where a representative sampling of the packets is obtained rather than all of them. Again, this sampling might be implemented inside switches or hosts. Preferably, the sampling of packets is random, although other approaches are possible. For example, packets may be sampled during certain time intervals or any other selective manner.

The invention additionally contemplate that in one embodiment the packet traffic monitor will react selectively to packets or higher-level information it receives about packets from components such as hosts. To that end, it is further envisioned that hosts and other components are capable of observing and delivering such information to the packet traffic monitor. Then, the packet traffic monitor may choose to act or not to act in response to such information. For example, a host may be able to detect an undesirable pattern of packet traffic that may not be obvious by low-level observations of packets (such as e-mail spam from another host). That host may be able to send the information about the observed packets to the packet traffic monitor. Then, the packet traffic monitor may use filters and configuration parameters to decide whether the information it is receiving is likely to be trustworthy, and how to act on it, if at all.

In yet another embodiment, many points in the network can be observed or sampled by one packet traffic monitor or by a set of co-operating packet traffic monitors. The packet traffic monitor may be able to detect undesirable packet traffic patterns or usage of network resources that are not observable from the vantage of one point alone. For example, a monitor may be able to detect that a large number of hosts are "ganging up" on some other host, even though, individually, no single host is overloading the victim host.

Ideally, the packet traffic monitor would cause only the undesirable packets to be discarded and as close to their source as possible. When this is not possible, it may be necessary to discard more packets and perhaps further from the source. Since the packet traffic monitor may not in all cases be associated with the faulty component it may not be able to shut down that component directly. Instead, the packet traffic monitor resorts to switch(es) in the segment where the faulty host is attached. For example, the packet traffic monitor could ask the switch directly connected to the faulty host to stop forwarding particular packets from that host, all packets from that host, or perhaps all packets from the network segment to which that host is attached. The description of what packets should be discarded may not need to be directly related to the description of packets that were originally detected by the packet traffic monitor.

An alternative to discarding (or shutting off) undesirable packets at the source would be to discard them near their destination, if this is easier. In addition to shutting off the undesirable packets, the monitor may also notify an administrator of the action that had been taken.

CONCLUSION

The packet traffic monitor is able to recover the topology of a network, such as the switched Ethernet network, using commonly available information from SNMP (simple network management protocol) or any other suitable network management protocol. This feature makes it particularly useful to network administrators interested in planning improvements to the network infrastructure.

With this understanding of host locations, it becomes possible to disable the ports of switches that connect to offending hosts. The packet traffic monitor disables some misbehaving hosts, and reports misbehavior to the network administrator. By disconnecting offending hosts, it is possible to preserve connectivity between "correctly-behaving" hosts.

Although the present invention has been described in accordance with the embodiments shown, variations to the embodiments would be apparent to those skilled in the art and those variations would be within the scope and spirit of the present invention. Accordingly, it is intended that the specification and embodiments shown be considered as exemplary only, with a true scope of the invention being indicated by the following claims and equivalents.

What is claimed:

1. A method for limiting the impact of undesirable behavior of computers on a network through which packets of data are interchanged between the computers, comprising:

monitoring the network for any patterns of behavior;

determining, upon discovering that one or more of the patterns of behavior is undesirable, a type of the undesirable pattern of behavior;

determining a proper action for mitigating that type of undesirable behavior, the proper action including preventing dissemination through the network of packets associated with the undesirable behavior and allowing dissemination of packets not associated with the undesirable behavior, wherein preventing dissemination comprises at least one of changing a routing table, changing a forwarding table, turning off at least one port of a forwarding device, filtering on Internet Protocol (IP) addresses, and filtering on media access control (MAC) addresses, and wherein a discovery, including that of a network topology, facilitates the network monitoring and type of undesirable behavior determination, and wherein the dissemination through the network of packets associated with the undesirable behavior is prevented for a time period that is lengthened gradually as long as the undesirable behavior continues or intermittently reappears, the time period being gradually shortened if the undesirable behavior stops for a predetermined time.

2. The method of claim 1 wherein the time period corresponds to a skepticism level that depends on a history of the undesirable pattern of behavior, a skepticism level zero (0) denoting a good history.

3. The method of claim 1, wherein the undesirable pattern of behavior is characterized in that it matches behavior defined by a network administrator as notable or undesirable.

4. The method of claim 1, wherein the undesirable pattern of behavior is any network pathology characterized as a broadcast storm or an address resolution protocol (ARP) fight.

5. The method of claim 1, wherein the undesirable pattern of behavior includes any one or more of a stolen Internet protocol (IP) address, a stolen media access control (MAC) address, a malformed packet, too many packets directed to an overloaded server, too many probe packets directed to a firewall or too many ARP request packets.

6. The method of claim 1, wherein the undesirable pattern of behavior is a broadcast storm, and wherein the monitoring includes
recovering a topology of the network using information obtained through a network management protocol interface, and
learning historical packet traffic statistics for any segment of the network.

7. The method of claim 6, wherein the network management protocol is the simple network management protocol (SNMP).

8. The method of claim 1, wherein the undesirable pattern of behavior is a broadcast storm, and wherein the monitoring includes learning a topology of the network from a forwarding database or table of a forwarding device in the network.

9. The method of the claim 1, wherein the network is a shared data network.

10. The method of claim 8, wherein the network is a switched Ethernet network and the forwarding device is a switch.

11. The method of claim 8, wherein the network is a bridged Ethernet network and the forwarding device is a bridge or a smart bridge.

12. The method of the claim 1, wherein the undesirable pattern of behavior is too many ARP requests and wherein the monitoring includes verifying stability and lack of conflicts in an IP or MAC address mapping.

13. The method of the claim 1, wherein the proper action further includes alerting a system administrator about the existence of the undesirable pattern of behavior.

14. The method of claim 1, wherein the undesirable pattern of behavior is a simultaneous use of a network address, and wherein the proper action includes disabling any address associated to the network address that contradicts an address list in a network server or disabling any associated address that is not included in a list of addresses that are allowed to map to the network address.

15. The method of claim 1 wherein discovery of the network topology facilitates disablement of ports in forwarding devices that connect to offending computers.

16. The method of claim 1 wherein the time period becomes longer in a random exponential backoff before an attempt is made to allow resumption of the packets from any offending computer that originated the undesirable pattern of behavior, the time period becoming longer if the undesirable pattern of behavior reoccurs during a current backoff time, the time period becoming shorter if the undesirable pattern of behavior disappears and does not reoccur in the current backoff time.

17. A system for limiting the impact of undesirable behavior of computers on a network through which packets of data are interchanged between the computers, comprising:
means for monitoring the packets for any patterns of behavior;
means for determining, upon discovering that one or more of the patterns of behavior is undesirable, a type of the undesirable pattern of behavior;
means for determining a proper action for mitigating that type of undesirable behavior, the proper action, performed by mitigation means, including preventing dissemination through the network of packets associated with the undesirable behavior and allowing dissemination of packets not associated with the undesirable behavior,
wherein preventing dissemination comprises at least one of changing a routing table, changing a forwarding table, and turning off at least one port of a forwarding device, and
wherein means for discovery, including that of a network topology, facilitates network monitoring and type of undesirable behavior determination, and
wherein the dissemination through the network of packets associated with the undesirable behavior is prevented for a time period that is lengthened gradually as long as the undesirable behavior continues or intermittently reappears, the time period being gradually shortened if the undesirable behavior stops for a predetermined time.

18. The system of claim 17, wherein the time period corresponds to a skepticism level that depends on a history of the undesirable pattern of behavior, a skepticism level zero (0) denoting a good history.

19. The system of claim 17, wherein the undesirable pattern of behavior is characterized in that it matches behavior defined by a network administrator as notable or undesirable.

20. The system of claim 17, wherein the undesirable pattern of behavior is any network pathology characterized as a broadcast storm or an address resolution protocol (ARP) fight.

21. The system of claim 17, wherein the undesirable pattern of behavior includes any one or more of a stolen Internet protocol (IP) address, a stolen media access control (MAC) address, a malformed packet, too many packets directed to an overloaded server, too many probe packets directed to a firewall or too many ARP request packets.

22. The system of claim 17, wherein preventing the dissemination of Packets associated with the undesirable pattern of behavior includes discarding the packets associated with such behavior, isolating any of the computers at which such behavior originates, or isolating any network segments at which such behavior originates.

23. The system of claim 17, wherein the undesirable pattern of behavior is a broadcast storm, and wherein the monitoring means includes
means for recovering a topology of the network using information obtained through a standard SNMP (simple network management protocol) interface, and
means for learning historical packet traffic statistics for any segment of the network.

24. The system of claim 17, wherein the undesirable pattern of behavior is a broadcast storm, and wherein the monitoring means includes means for learning the topology of the network from a forwarding database or table of a forwarding device in the network.

25. The system of claim 24, wherein the network is a switched Ethernet network and the forwarding device is a switch.

26. The system of claim 17, wherein the network is a shared data network.

27. The system of claim 17, wherein the undesirable pattern of behavior is too many ARP requests and wherein the monitoring means includes means for verifying stability and lack of conflicts in an IP or MAC address mapping.

28. The system of claim 17 wherein the proper action includes alerting a system administrator about the existence of the undesirable pattern of behavior.

29. The system of claim 17, wherein the undesirable pattern of behavior is a simultaneous use of a network address, and wherein the proper action includes disabling any address associated to the network address that contradicts an address list in a network server or disabling any associated address that is not included in a list of addresses that are allowed to map to the network address.

30. The system of claim 17, wherein discovery of the network topology facilitates disablement of ports in forwarding devices that connect to offending computers.

31. The system of claim 17, wherein the time period becomes longer in a random exponential backoff before an attempt is made to allow resumption of the packets from any offending computer that originated the undesirable pattern of behavior, the time period becoming longer if the undesirable pattern of behavior reoccurs during a current backoff time, the time period becoming shorter if the undesirable pattern of behavior disappears and does not reoccur in the current backoff time.

32. The method of claim 17, wherein the dissemination through the network of packets associated with the undesirable behavior is prevented for a time period that is exponentially increasing as long as the undesirable behavior continues or intermittently reappears, the time period being exponentially shortened if the undesirable behavior stops for a predetermined time.

* * * * *

UNITED STATES PATENT AND TRADEMARK OFFICE
CERTIFICATE OF CORRECTION

PATENT NO. : 7,383,574 B2  Page 1 of 1
APPLICATION NO. : 09/991108
DATED : June 3, 2008
INVENTOR(S) : Michael Burrows et al.

It is certified that error appears in the above-identified patent and that said Letters Patent is hereby corrected as shown below:

On the Title page, in Item (73), in "Assignee", in column 1, lines 1-2, delete "Hewlett Packard Development Company" and
insert -- Hewlett-Packard Development Company, --, therefor.

On the Title page, in Item (22), in "Filed", in column 1, line 1, delete "Nov. 16, 200" and insert -- Nov. 16, 2001 --, therefor.

In column 3, line 18, delete "modem" and insert -- modern --, therefor.

In column 15, line 6, in Claim 2, after "claim 1" insert -- , --.

In column 15, line 61, in Claim 15, after "claim 1" insert -- , --.

In column 15, line 64, in Claim 16, after "claim 1" insert -- , --.

In column 16, line 55, in Claim 22, delete "Packets" and insert -- packets --, therefor.

Signed and Sealed this

Twenty-fifth Day of August, 2009

David J. Kappos
*Director of the United States Patent and Trademark Office*

UNITED STATES PATENT AND TRADEMARK OFFICE
CERTIFICATE OF CORRECTION

PATENT NO. : 7,383,574 B2  
APPLICATION NO. : 09/991108  
DATED : June 3, 2008  
INVENTOR(S) : Burrows et al.

Page 1 of 1

It is certified that error appears in the above-identified patent and that said Letters Patent is hereby corrected as shown below:

In Column 15, Line 47, in Claim 12, delete "of the" and insert -- of --, therefor.

In Column 15, Line 51, in Claim 13, delete "of the" and insert -- of --, therefor.

In Column 18, Line 14, in Claim 32, delete "method" and insert -- system --, therefor.

Signed and Sealed this  
Twenty-seventh Day of November, 2012

David J. Kappos  
*Director of the United States Patent and Trademark Office*